(12) United States Patent
Jiang

(10) Patent No.: US 11,362,316 B2
(45) Date of Patent: Jun. 14, 2022

(54) BATTERY HAVING HYBRID CATHODE CONFIGURATION

(71) Applicant: Pacesetter, Inc., Sylmar, CA (US)

(72) Inventor: Xiaofei Jiang, Clemson, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 175 days.

(21) Appl. No.: 16/714,543

(22) Filed: Dec. 13, 2019

(65) Prior Publication Data

US 2020/0212425 A1 Jul. 2, 2020

Related U.S. Application Data

(60) Provisional application No. 62/786,053, filed on Dec. 28, 2018.

(51) Int. Cl.

| | |
|---|---|
| *H01M 4/06* | (2006.01) |
| *H01M 4/131* | (2010.01) |
| *H01M 4/133* | (2010.01) |
| *H01M 4/485* | (2010.01) |
| *H01M 4/54* | (2006.01) |
| *H01M 6/18* | (2006.01) |
| *H01M 4/48* | (2010.01) |
| *H01M 6/16* | (2006.01) |
| *H01M 4/583* | (2010.01) |
| *H01M 4/02* | (2006.01) |

(52) U.S. Cl.
CPC ............ *H01M 4/06* (2013.01); *H01M 4/131* (2013.01); *H01M 4/133* (2013.01); *H01M 4/483* (2013.01); *H01M 4/485* (2013.01); *H01M 4/54* (2013.01); *H01M 4/583* (2013.01); *H01M 6/16* (2013.01); *H01M 6/181* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 4,098,258 | A | * | 7/1978 | Kober ................. H05B 3/10 429/8 |
| 4,310,609 | A | | 1/1982 | Liang et al. |
| 4,830,940 | A | | 5/1989 | Keister et al. |
| 4,964,877 | A | | 10/1990 | Keister et al. |
| 5,180,642 | A | | 1/1993 | Weiss et al. |
| 5,221,453 | A | | 6/1993 | Crespi |

(Continued)

OTHER PUBLICATIONS

U.S. Appl. No. 16/057,605 entitled "Systems and Methods for Applying Anti-Tachycardia Pacing Using Subcutaneous Implantable Cardioverter-Defibrillators", filed Aug. 7, 2018.

*Primary Examiner* — Laura Weiner

(74) *Attorney, Agent, or Firm* — Lerner, David, Littenberg, Krumholz & Mentlik, LLP

(57) ABSTRACT

Batteries having hybrid electrode configurations are disclosed herein. In one embodiment, a battery comprises an electrode assembly. The electrode assembly comprises a first cathode including a first cathode active material, a second cathode including a second cathode active material different from the first cathode active material, a first anode disposed between the first cathode and the second cathode, a first separator interposed between the first cathode and the first anode, and a second separator interposed between the second cathode and the first anode.

14 Claims, 7 Drawing Sheets

(56) References Cited

U.S. PATENT DOCUMENTS

| | | |
|---|---|---|
| 5,435,874 A | 7/1995 | Takeuchi et al. |
| 5,458,997 A | 10/1995 | Crespi et al. |
| 5,545,497 A | 8/1996 | Takeuchi et al. |
| 5,571,640 A | 11/1996 | Takeuchi et al. |
| 5,639,577 A | 6/1997 | Takeuchi et al. |
| 5,667,916 A | 9/1997 | Ebel et al. |
| 5,753,389 A | 5/1998 | Gan et al. |
| 5,766,797 A | 6/1998 | Crespi et al. |
| 5,955,218 A | 9/1999 | Crespi et al. |
| 6,017,656 A | 1/2000 | Crespi et al. |
| 6,174,622 B1 | 1/2001 | Thiebolt, III et al. |
| 6,327,498 B1 | 12/2001 | Kroll |
| 6,451,483 B1 | 9/2002 | Probst et al. |
| 6,535,762 B1 | 3/2003 | Mouchawar |
| 6,551,747 B1 | 4/2003 | Gan |
| 6,566,007 B1 | 5/2003 | Takeuchi et al. |
| 6,692,865 B2 | 2/2004 | Gan et al. |
| 6,737,191 B2 | 5/2004 | Gan et al. |
| 6,783,888 B2 | 8/2004 | Gan et al. |
| 7,572,551 B1 | 8/2009 | Panzer et al. |
| 7,651,647 B1 | 1/2010 | Strange et al. |
| 9,985,294 B2 * | 5/2018 | Jiang ............... H01M 4/663 |
| 2019/0336753 A1 | 11/2019 | Min et al. |

* cited by examiner

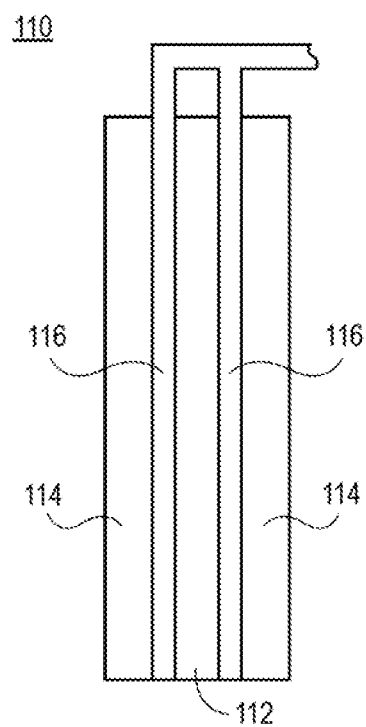 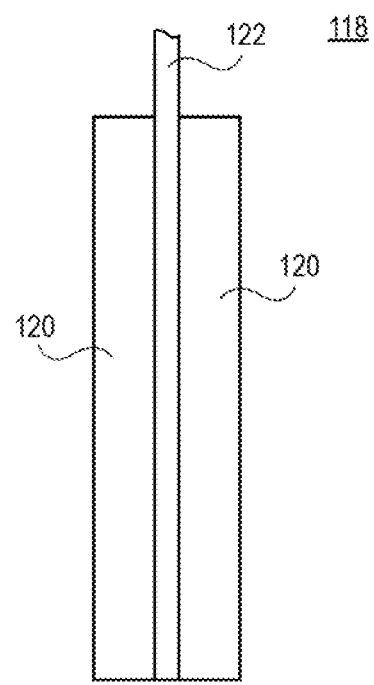
FIG. 1B
(PRIOR ART)
FIG. 1C
(PRIOR ART)

BATTERY HAVING HYBRID CATHODE CONFIGURATION

This application claims the benefit of U.S. Provisional Patent Application No. 62/786,053, filed on Dec. 28, 2018. The patent application identified above is incorporated here by reference in its entirety to provide continuity of disclosure.

FIELD

The present disclosure relates to electrochemical devices. In particular, the present disclosure relates to batteries.

BACKGROUND

Electrochemical cells or batteries are used as the power source in many applications, including implantable medical devices. FIG. 1A schematically illustrates an exemplary design for a battery 100 known in the art. Battery 100 includes a cathode 102, an anode 104 separated from the cathode via a separator 106, and some form of electrolyte 108 in contact with anode 104 and cathode 102. The current from battery 100 is typically delivered to a load 110, such as an implantable medical device. The size of load 110 affects the amount of current that flows between anode 104 and cathode 102.

Many medical device electrochemical cells are designed for high current pulse discharge and low or no voltage delay. This design requirement is particularly important in an implantable cardioverter defibrillator (ICD), also referred to as an implantable defibrillator, since an ICD must deliver high voltage shocks to the heart immediately after the detection of arrhythmia. It is desirable for these cells to have a high energy density to allow for the small size of implantable medical devices. An end-of-life (EOL) indicator for the battery may also be an important feature for this kind of application.

A silver vanadium oxide (SVO) cathode active material offers a high discharge rate capability and an EOL indicator because of its sloped discharge voltage curve. Another cathode active material, sub-fluorinated carbon fluoride (CFx, where x=~1), offers a higher energy density, but it has a low discharge rate capability and no EOL indicator. These two cathode active materials have been combined in several types of cathode designs in an attempt to obtain the beneficial properties of each active material.

FIG. 1B illustrates a three-layer cathode 110 which can be utilized in place of the cathode 102 in battery 100. In the three-layer cathode 110, a sub-fluorinated carbon fluoride (CFx) layer 112 is disposed between two SVO layers 114, with two current collectors 116 separating layer 112 from layers 114. The three-layer design has a low packing efficiency due to the need for two current collectors. This design also increases manufacturing complexity.

FIG. 1C illustrates a mixed cathode 118 which can be utilized in place of the cathode 102 in battery 100. In mixed cathode 118, sub-fluorinated carbon fluoride (CFx) and SVO are mixed together to form single layers 120 on a current collector 122. This mixed cathode design simplifies the manufacturing process but has a lower discharge rate capability than a pure SVO cathode.

A cathode which provides a high energy density and a high discharge rate capability, and which acts as an EOL indicator for the battery presents a challenge which must be addressed.

BRIEF SUMMARY

Batteries having hybrid electrode configurations are disclosed herein.

One aspect of the present disclosure relates to a battery. The battery comprises an electrode assembly. The electrode assembly comprises a first cathode including a first cathode active material, a second cathode including a second cathode active material different from the first cathode active material, a first anode disposed between the first cathode and the second cathode, a first separator interposed between the first cathode and the first anode, and a second separator interposed between the second cathode and the first anode.

BRIEF DESCRIPTION OF THE DRAWINGS

The accompanying drawings, which are incorporated herein and form part of the specification, illustrate the devices and methods presented herein. Together with the detailed description, the drawings further serve to explain the principles of, and to enable a person skilled in the relevant art(s) to make and use, the methods and systems presented herein.

In the drawings, like reference numbers indicate identical or functionally similar elements. Further, the drawing in which an element first appears is typically indicated by the leftmost digit(s) in the corresponding reference number.

FIG. 1B is a schematic cross-sectional view of a cathode in accordance with the prior art.

FIG. 1C is a schematic cross-sectional view of another cathode in accordance with the prior art.

DETAILED DESCRIPTION

Figure 1A:
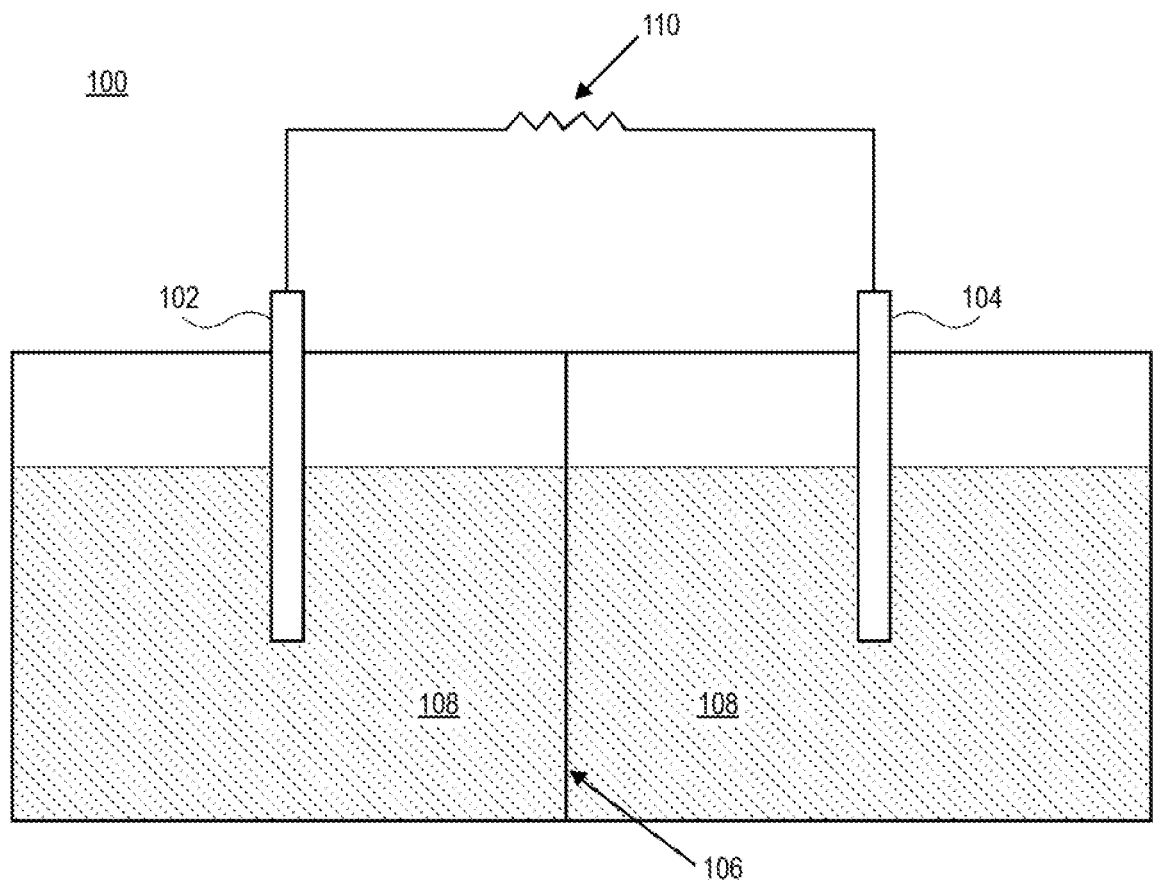
FIG. 1A is a schematic view of a battery in accordance with the prior art.

The following detailed description of battery designs refers to the accompanying drawings that illustrate exemplary embodiments consistent with these devices. Other embodiments are possible, and modifications may be made to the embodiments within the spirit and scope of the methods and systems presented herein. Therefore, the following detailed description is not meant to limit the devices described herein. Rather, the scope of these devices is defined by the appended claims.

Before describing in detail the design and method of making electrodes of a battery, it is helpful to describe an example environment in which such a battery may be implemented. The battery embodiments described herein may be particularly useful in the environment of an IMD such as an implantable cardiac device (ICD) and subcutaneous-ICDs (S-ICDs). Examples of such ICDs may be found in U.S. Pat. Nos. 6,327,498 and 6,535,762, each of which is incorporated herein by reference. And examples of such S-ICDs may be found in U.S. Publication No. 2019/0336753 and U.S. application Ser. No. 16/057,605, each of which is incorporated herein by reference.

Battery Design

ICDs and S-ICDs, such as those described in the patents and applications identified above, require some form of power source in order to operate. A primary lithium battery may be used to provide a high current output power source.

ICDs and S-ICDs treat ventricular fibrillation, also known as sudden cardiac death. Ventricular fibrillation is characterized by rapid, erratic contraction of the heart resulting in little or no pumping of blood and is generally a fatal condition. An ICD delivers a high-energy pulse (typically up to 35 or 40 J for a conventional transvenous ICD) to the heart within seconds of detecting ventricular fibrillation. Minimizing the time a patient remains in fibrillation is an important goal of this therapy. To deliver this life-saving therapy, the ICD battery charges a capacitor to a desired energy level in as short a time as possible, and the capacitor is subsequently discharged through the heart. Because prompt therapy is desirable, the capacitor charge-time, typically in the range of 5 to 15 seconds, is a measure of device performance.

Unlike a conventional transvenous ICD, an S-ICD uses an electrode configuration that can reside entirely within the subcutaneous space. The pulse generator is positioned along a side of the patient's chest below the arm pit (e.g., over the sixth rib near the left mid-axillary line). A lead extends from the pulse generator along the side of the patient toward the sternum. The lead then turns to extend parallel to the mid-sternal line and is positioned adjacent to the sternum extending between the xiphoid process and the manubriosternal junction. This portion of the lead includes a shock coil that is flanked by two sensing electrodes. The sensing electrodes sense the cardiac rhythm and the shock coil delivers counters-hocks through the subcutaneous tissue of the chest wall. Unlike a conventional transvenous ICD, S-ICDs lack intravenous and intracardiac leads and, as such, are less likely to have the noted complications associated with more invasive devices. Current electrode configurations for S-ICDs, however, have some challenges or undesirable features. For instance, S-ICDs are relatively large and exhibit higher defibrillation threshold (DFTs) as compared to modern transvenous ICDs. For example, an S-ICD may be 60-70 mL in volume, as compared to a 30 mL transvenous ICD. As another example, an S-ICD may utilize DFTs of 80 J, as compared to 40 J for transvenous ICDs.

FIGS. 2 through 5 illustrate embodiments of batteries and electrode assemblies in accordance with present disclosure. Based on design requirements of battery capacity and discharge current, one or more cathodes having sub-fluorinated carbon fluoride (CFx, where x=~1) as a cathode active material and one or more cathodes having silver vanadium oxide (SVO) as a cathode active material may be used in a battery or electrode assembly. For example, additional cathodes having SVO as a cathode active material can result in a battery with a higher discharge rate capability. Also, additional cathodes (or thicker cathodes) having sub-fluorinated carbon fluoride as a cathode active material can result in a battery having a higher total energy density. The combination of cathodes having sub-fluorinated carbon fluoride as a cathode active material and cathodes having SVO as a cathode active material provides the benefits of both materials, and also allows a battery to operate at a higher voltage during pulse discharge. Though not wanting to be bound by any particular theory, it is believed that an SVO cathode is recharged by a sub-fluorinated carbon fluoride cathode and maintains the SVO cathode at its first discharge plateau of about 2.8V during most of the battery discharge life. The usable battery capacity from Elective Replacement Indicator (ERI) to End of Service (EOS) can also be precisely tailored by adjusting the total amount of SVO to sub-fluorinated carbon fluoride in the battery.

Figure 2:
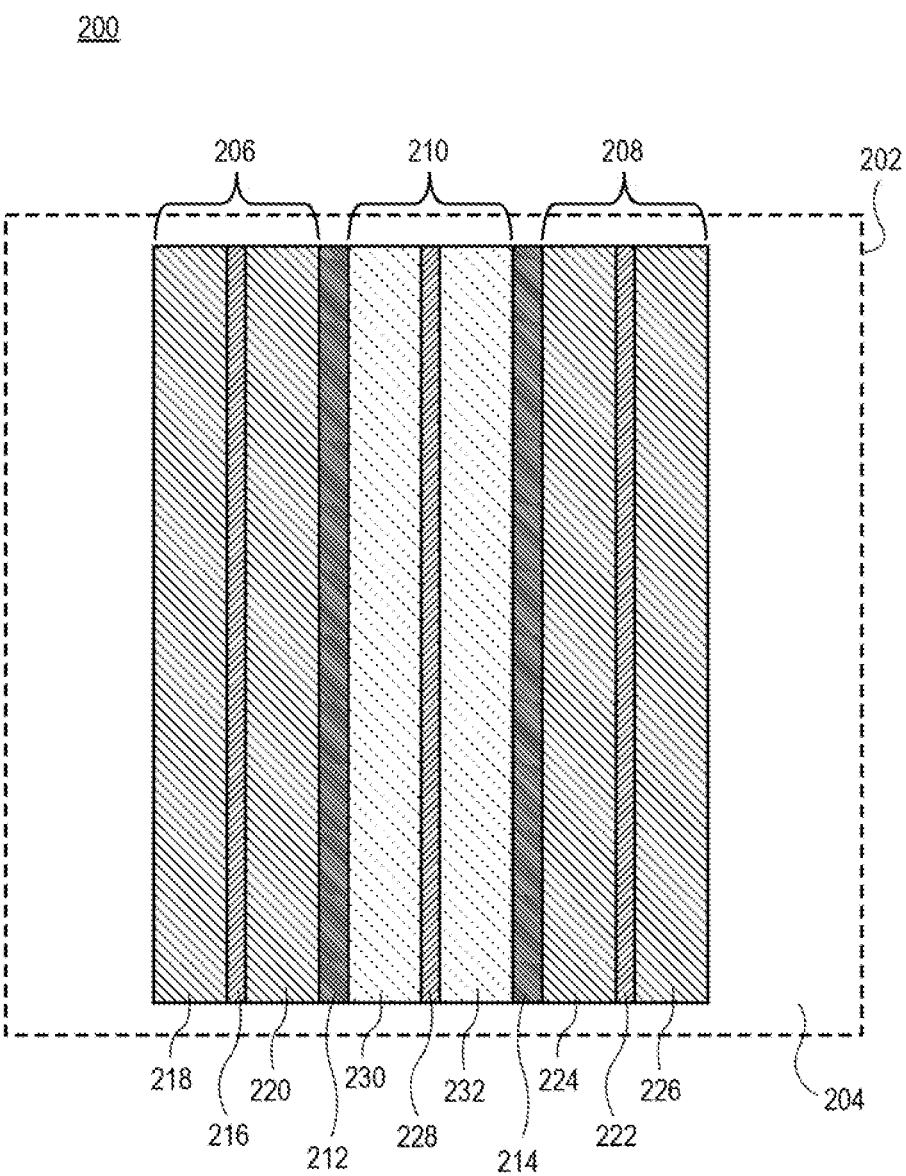
FIG. 2 is a schematic cross-sectional view of a battery in accordance with an embodiment of the present disclosure.

FIG. 2 is a schematic cross-sectional view of a battery 200 in accordance with an embodiment of the present disclosure. Battery 200 includes an electrode assembly enclosed within a case 202, wherein the electrode assembly is contacted by an electrolyte 204. An 'electrode assembly' as used herein comprises a stacked arrangement of one or more anodes, one or more cathodes, one or more current collectors and one or more separators of a battery.

In battery 200, the electrode assembly includes a first cathode 206, a second cathode 208, an anode 210, a first separator 212, and a second separator 214. The electrode assembly in battery 200 is a stacked structure that alternates between a cathode and an anode, with a separator interposed between the anode and each cathode. In battery 200, anode 210 is disposed between the first cathode 206 and the second cathode 208. The first separator 212 is interposed between the first cathode 206 and anode 210, and the second separator 214 is interposed between the second cathode 208 and anode 210.

The first cathode 206 includes a first cathode active material. In an embodiment, the first cathode active material comprises sub-fluorinated carbon fluoride represented by the chemical formula: CFx, where $0.8 \leq x \leq 1.2$. In an embodiment, x may be about 1.1. The CFx may comprise ARC1000 CFx produced from petroleum coke. The second cathode 208 includes a second cathode active material. In an embodiment, the second cathode active material comprises silver vanadium oxide (SVO). An example of the silver vanadium oxide includes $Ag_2V_4O_{11}$. In an embodiment, the first cathode 206 does not include the second cathode active material and the second cathode 208 does not include the first cathode active material.

The first cathode 206 includes a current collector 216 having a first electrode layer 218 disposed on one side thereof, and a second electrode layer 220 disposed on an opposite side thereof. In certain embodiments, each of the first and second electrode layers 218, 220 includes the first cathode active material, in an amount ranging from about 50 to about 98 percent by weight (wt %), based on the total weight of the electrode layer. In certain embodiments, each of the first and second electrode layers 218, 220 comprises ARC1000 CFx in an amount ranging from about 80 wt % to 98 wt %, based on the total weight of the electrode layer 218, 220. In an embodiment, each of the first and second electrode layers 218, 220 comprises ARC1000 CFx in an amount of about 94 wt %, based on the total weight of the electrode layer 218, 220.

Additionally, in certain embodiments, each of the first and second electrode layers 218, 220 has a thickness ranging from about 50 micrometers to 5000 micrometers. In certain embodiments, each of the first and second electrode layers 218, 220 has a thickness ranging from about 100 micrometers to 2500 micrometers.

In addition to the first cathode active material, the first and second electrode layers 218, 220 of the first cathode 206 may each include material(s) selected from the group consisting of binders, conductive materials, and mixtures thereof. Binders may include polytetrafluorethylene (PTFE) or polyvinylidene fluoride (PVDF). The binder may be added to the electrode layer to bind particles of the first cathode active material together. The binder may be present in the electrode layer in an amount ranging from about 1 to about 15 wt %, based on the total weight of the electrode layer. In an embodiment, the binder may be Daikin F-104 PTFE and may comprise about 2 wt % of each of the first and second electrode layers 218, 220, based on the total weight of the electrode layer 218, 220. Exemplary conductive additives may include carbon black, carbon nanotube, graphite, graphene, metal powders or combinations thereof. The conductive additive may be added to the electrode layers to improve the electrical conductivity of the electrode. The conductive additive may be included in the electrode layers in amounts ranging from about 1 to about 20 wt %, based on the total weight of the electrode layer. In an embodiment, the conductive additive is TIMCAL C-NERGY Super C65 carbon black and may comprise about 4 wt % of each of the first and second electrode layers 218, 220, based on the total weight of the electrode layer 218, 220.

In an embodiment, each of the first and second electrode layers 218, 220 comprises about 94 wt % ARC1000 CFx, about 4 wt % TIMCAL C-NERGY Super C65 carbon black, and about 2 wt % Daikin F-104 PTFE, based on the total weight of the electrode layer 218, 220.

Current collector 216 may be in the form of a sheet or plate and may be formed from any suitable material that allows current to flow. In an embodiment, the currently collector may be metal. Exemplary metals include aluminum, nickel, and/or copper.

The second cathode 208 may include a current collector 222 having a first electrode layer 224 disposed on one side thereof, and a second electrode layer 226 disposed on an opposite side thereof. In an embodiment, each of the first and second electrode layers 224, 226 includes the second cathode active material, preferably in an amount ranging from about 50 to about 98 percent by weight (wt %), based on the total weight of the electrode layer.

In an embodiment, each of the first and second electrode layers 224, 226 comprises silver vanadium oxide (SVO). In an embodiment, the SVO is $Ag_2V_4O_{11}$. In certain embodiments, each of the first and scond electrode layers 224, 226 comprises SVO in an amount of about 80 wt % to 98 wt % based on the total weight of the electrode layer 224, 226. In an embodiment, each of the first and second electrode layers 224, 226 comprises SVO in an amount of about 94 wt %, based on the total weight of the electrode layer 224, 226. Additionally, each of the first and second electrode layers 224, 226 has a thickness ranging from about 0.5 to about 100 microns.

In addition to the second cathode active material, the first and second electrode layers 224, 226 of the second cathode 208 may each include material(s) selected from the group consisting of binders, conductive materials, and mixtures thereof. Exemplary binders and conductive additives, and the respective amounts thereof in the second cathode 208, may be the same as those described above for the first cathode 206.

In an embodiment, each of the first and second electrode layers 224, 226 comprises about 94 wt % SVO, about 3 wt % TIMCAL C-NERGY Super C65 carbon black, and about 3 wt % Daikin F-104 PTFE, based on the total weight of the electrode layer 224, 226.

Current collector 222 may be in the form of a sheet or plate and may be formed from any suitable material that allows current to flow, including those materials described above with respect to current collector 216.

Anode 210 includes a current collector 228 having a first electrode layer 230 disposed on one side thereof, and a second electrode layer 232 disposed on an opposite side thereof. The first and second electrode layers 230, 232 each include an anode active material. In an embodiment, the anode active material is lithium (Li). The first and second electrode layers 230, 232 may be in the form of lithium metal sheets coupled to opposite sides of current collector 228. Alternatively, the anode active material may include carbon-based materials such as graphite. In certain embodiments, each of the first and second electrode layers 230, 232 includes the anode active material in an amount ranging from about 50 to about 98 percent by weight (wt %), based on the total weight of the electrode layer. Additionally, each of the first and second electrode layers 230, 232 has a thickness ranging from about 100 micrometers to 2500 micrometers.

The first and second electrode layers 230, 232 of anode 210 may each include material(s) selected from the group consisting of binders, conductive materials, and mixtures thereof. Exemplary binders and conductive additives, and the respective amounts thereof in anode 210, may be the same as those described above for the first cathode 206.

Current collector 228 may be in the form of a sheet or plate and may be formed from any suitable material that allows current to flow, including those materials described above with respect to current collector 216.

The first and second separators 212, 214 may be configured such that ions may pass through the separators between the first cathode 206 and anode 210, and between the second cathode 208 and the anode. The first and second separators 212, 214 may be made of an electrically insulating material that limits or prevents electrical conduction between anode 210 and each of cathodes 206, 208. Exemplary materials for the first and second separators 212, 214 may include polyethylene.

Although not explicitly illustrated in FIG. 2, electrolyte 204 would also be present around the first and second cathode active materials and the anode active material to facilitate ion transport between the anode and cathode materials. The electrolyte may be a polymer or liquid electrolyte as would be understood by one skilled in the art. Examples of the electrolyte include lithium bis-trifluoromethanesulfonimide (LiTFSI) in propylene carbonate/dimethoxyethane or lithium hexafluoroarsenate ($LiAsF_6$) in propylene carbonate/dimethoxyethane.

Although not explicitly illustrated in FIG. 2, current collectors 216, 222, which are the current collectors of the first and second cathodes 206, 208, may be electrically connected to one another to form a positive terminal of battery 200. Current collector 228 of anode 210 forms the negative terminal of battery 200.

Figure 3:
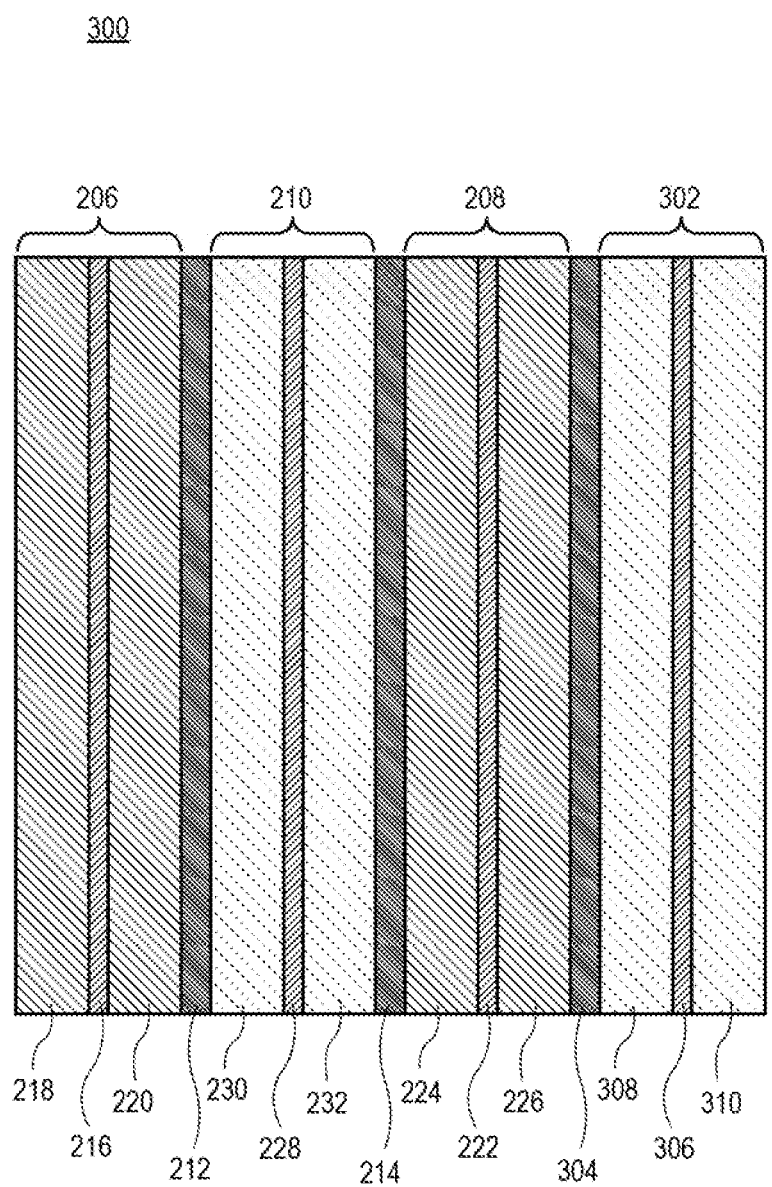
FIG. 3 is a schematic cross-sectional view of an electrode assembly in accordance with an embodiment of the present disclosure.

FIG. 3 is a schematic cross-sectional view of an electrode assembly 300 in accordance with an embodiment of the present disclosure. Electrode assembly 300 includes the components of the electrode assembly in battery 200, as well as an additional anode 302 and an additional separator 304. While electrode assembly 300 would be enclosed in a case having an electrolyte to form a battery, neither a case nor an electrolyte is illustrated in FIG. 3.

Anode 302 is disposed on an opposite side of the second cathode 208 from anode 210. Separator 304 is interposed between the second cathode 208 and anode 302. Alternatively, and not illustrated in FIG. 3, anode 302 could be disposed on the side of the first cathode 206 opposite from anode 210, and separator 304 could be interposed between the first cathode 206 and anode 302.

Anode 302 includes a current collector 306, a first electrode layer 308 disposed on one side of the current collector, and a second electrode layer 310 disposed on an opposite side of the current collector. Electrode layers 308, 310 and current collector 306 may be, respectively, equivalent to electrode layers 230, 232 and current collector 228 of anode 210. Similarly, separator 304 may be equivalent to either of separators 212, 214.

Figure 4:
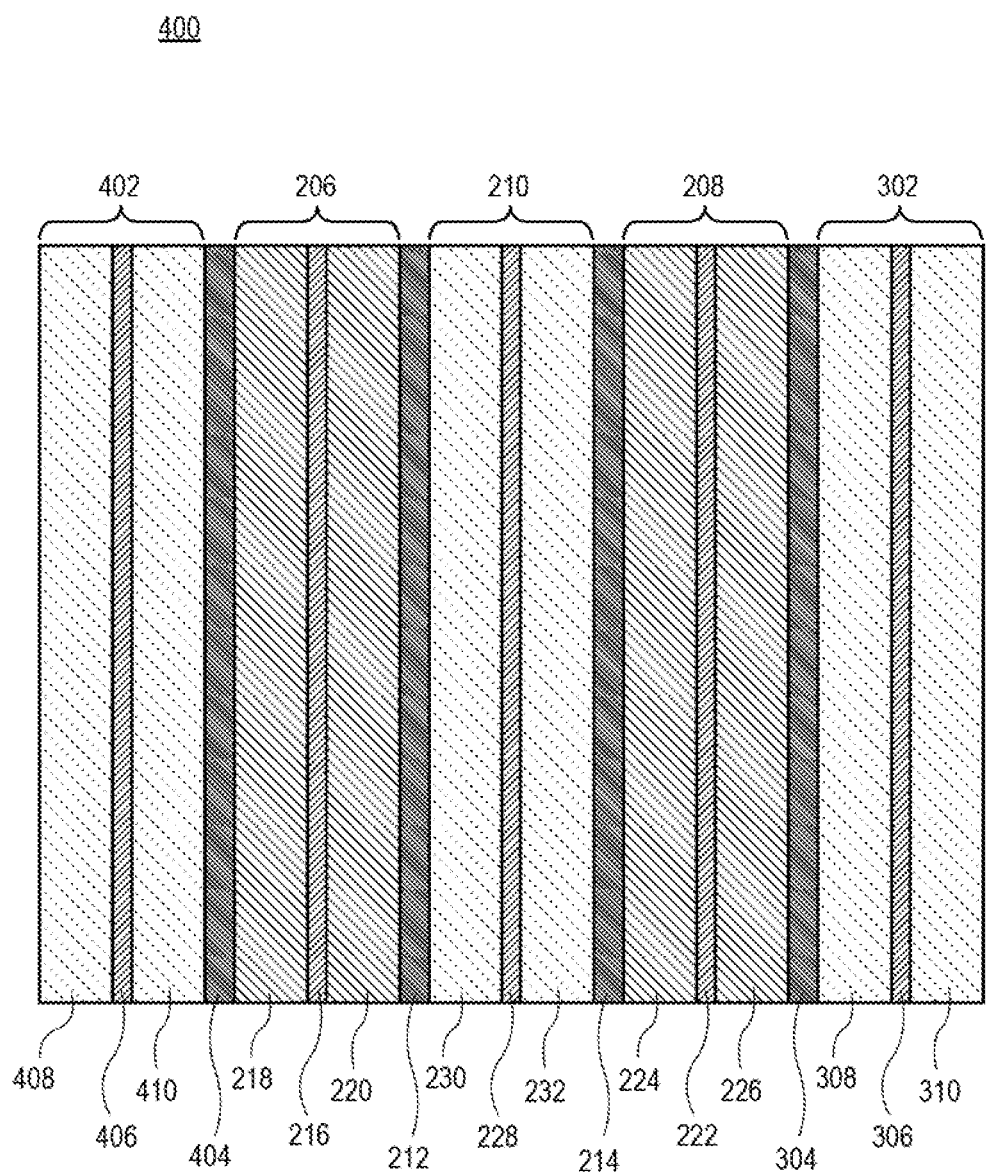
FIG. 4 is a schematic cross-sectional view of another electrode assembly in accordance with an embodiment of the present disclosure.

FIG. 4 is a schematic cross-sectional view of an electrode assembly 400 in accordance with another embodiment of the present disclosure. Electrode assembly 400 includes the components of electrode assembly 300, along with an additional anode 402 and an additional separator 404. While electrode assembly 400 would be enclosed in a case having an electrolyte to form a battery, neither a case nor an electrolyte is illustrated in FIG. 4.

Anode 402 is disposed on the side of the first cathode 206 opposite anode 210. Separator 404 is interposed between the first cathode 206 and anode 402.

Anode 402 includes a current collector 406, a first electrode layer 408 disposed on one side of the current collector, and a second electrode layer 410 disposed on an opposite side of the current collector. Electrode layers 408, 410 and current collector 406 may be, respectively, equivalent to electrode layers 230, 232 and current collector 228 of anode 210. Similarly, separator 404 may be equivalent to either of separators 212, 214.

Figure 5:
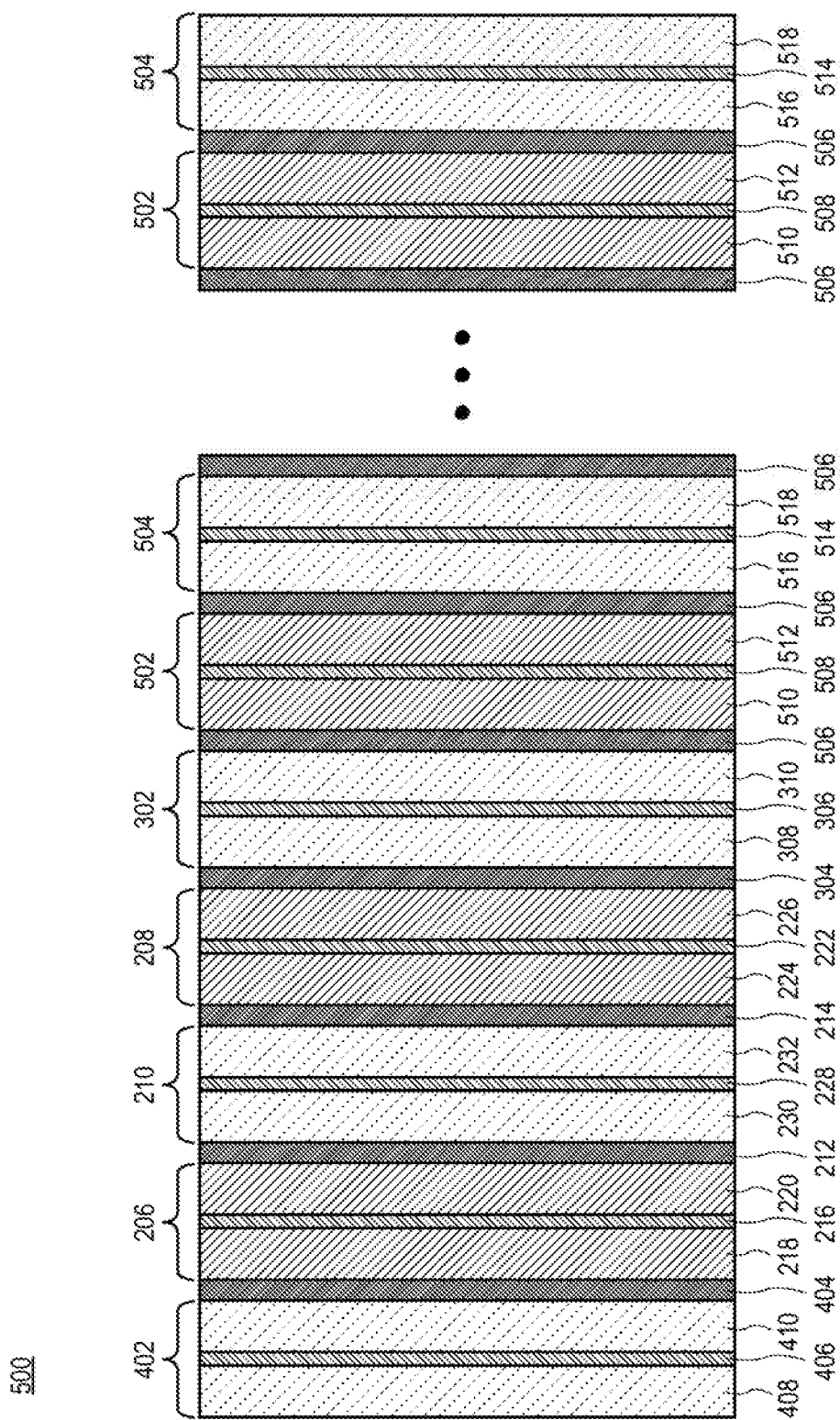
FIG. 5 is a schematic cross-sectional view of yet another electrode assembly in accordance with an embodiment of the present disclosure.

FIG. 5 is a schematic cross-sectional view of an electrode assembly 500 in accordance with yet another embodiment of the present disclosure. Electrode assembly 500 includes the components of electrode assembly 400, as well as a plurality of additional second cathodes 502, anodes 504, and separators 506, wherein the additional second cathodes, separators, and anodes are stacked in an alternating arrangement beginning on the side of anode 302 opposite the second cathode 208. That is, beginning on the side of anode 302 opposite the second cathode 208, electrode assembly 500 includes a separator 506, a second cathode 502, another separator 506, an anode 504, another separator 506, another second cathode 502, another separator 506, another anode 504, etc. This sequence is continued, with each additional anode 504, with the exception of the final additional anode, disposed between two additional second cathodes 502, with a separator 506 interposed between each pair of electrode layers. While electrode assembly 500 would be enclosed in a case having an electrolyte to form a battery, neither a case nor an electrolyte is illustrated in FIG. 5. The number of additional second cathodes 502 that may be included in electrode assembly 500 may range from 2 to 15. For illustrative purposes, only two additional second cathodes 502 are shown in FIG. 5.

Each additional second cathode 502 may be equivalent to the second cathode 208 and may include the same second cathode active material. The additional second cathodes include a current collector 508 having a first electrode layer 510 on one side thereof, and a second electrode layer 512 on an opposite side thereof. Electrode layers 510, 512 include the second cathode active material.

Each anode 504 includes a current collector 514, a first electrode layer 516 disposed on one side of the current collector, and a second electrode layer 518 disposed on an opposite side of the current collector. Electrode layers 516, 518 and current collector 514 may be, respectively, equivalent to electrode layers 230, 232 and current collector 228 of anode 210. Separators 506 may be equivalent to either of separators 212, 214.

The electrodes provided herein may be produced by non-limiting methods known in the art, such as by laminating an active material on a current collector using a pressed powder process, a calendar sheeting process, an extrusion process, a tape casting process or other known processes. Once stacked in an electrode assembly, the cathodes may be electrically connected to one another by connecting their respective current collectors together, such as by welding or the like. Similarly, the anodes may be electrically connected to one another by connecting their respective current collectors together in the same or a similar manner. The electrode assembly may then be sealed in a case and filled with an electrolyte to activate the battery. The SVO cathode provides the battery with a high discharge rate and an EOL indicator. The sub-fluorinated carbon fluoride cathodes provide high energy density to the hybrid battery.

The exemplary batteries electrode assemblies illustrated in FIGS. 2 through 5 are non-limiting examples of electrode assemblies, and other configurations of electrode assemblies may be utilized in accordance with the present invention. For example, electrode assemblies may include one or more first cathodes comprising sub-fluorinated carbon fluoride and one or more second cathodes comprising SVO. For instance, an electrode assembly may include a plurality of first cathodes and a plurality of second cathodes in some embodiments. The number of first cathodes and second cathodes present in a given electrode assembly may vary based on design requirements. Additional second cathodes having SVO as an active material can result in batteries with higher rate capability. Additional first cathodes having sub-fluorinated carbon fluoride as an active material or thicker first cathodes can result in higher battery capacity.

EXAMPLES

Example 1

Example 1 is a battery having the electrode assembly depicted in FIG. 3, which includes a first cathode having sub-fluorinated carbon fluoride as an active material, an anode having lithium metal as an active material, a second cathode having silver vanadium oxide as an active material, and a second anode having lithium metal as an active material. The first cathode comprised 94 wt % ARC1000 CFx, 4 wt % carbon black, and 2 wt % PTFE, based on the total weight of the first cathode. The second cathode comprised 94 wt % $Ag_2V_4O_{11}$, 3 wt % TIMCAL C-NERGY Super C65 carbon black, and 3 wt % Daikin F-104 PTFE, based on the weight of the second cathode.

The electrode assembly was assembled by stacking, in order, the first cathode, a separator, the anode, another separator, the second cathode, another separator, and another anode. Once assembled, the current collectors of the cathodes were electrically connected to one another and the current collectors of the anodes were electrically connected to one another. The electrode assembly was then inserted into a case and the case filled with an electrolyte and sealed.

Example 2

Example 2 was prepared in the same manner as Example 1, except the electrode assembly of Example 2 was assembled by stacking, in order, the anode, a separator, the first cathode, another separator, another anode, another separator, and the second cathode. The first cathode comprised 94 wt % ARC1000 CFx, 4 wt % carbon black, and 2 wt % PTFE, based on the total weight of the first cathode.

The second cathode comprised 94 wt % $Ag_2V_4O_{11}$, 3 wt % TIMCAL C-NERGY Super C65 carbon black, and 3 wt % Daikin F-104 PTFE, based on the weight of the second cathode.

Example 3

Example 3 was prepared in the same manner as Example 2, except the electrode assembly of Example 3 was assembled by stacking, in order, the anode, a separator, the first cathode, another separator, another anode, another separator, the second cathode, another separator, and another anode. The first cathode comprised 94 wt % ARC1000 CFx, 4 wt % carbon black, and 2 wt % PTFE, based on the total weight of the first cathode. The second cathode comprised 94 wt % $Ag_2V_4O_{11}$, 3 wt % TIMCAL C-NERGY Super C65 carbon black, and 3 wt % Daikin F-104 PTFE, based on the weight of the second cathode.

Comparative Example 1

Comparative Example 1 used only SVO as cathode active material. More specifically, the cathode comprised 94 wt % ARC1000 CFx, 4 wt % carbon black, and 2 wt % PTFE, based on the total weight of the cathode.

Figure 6:
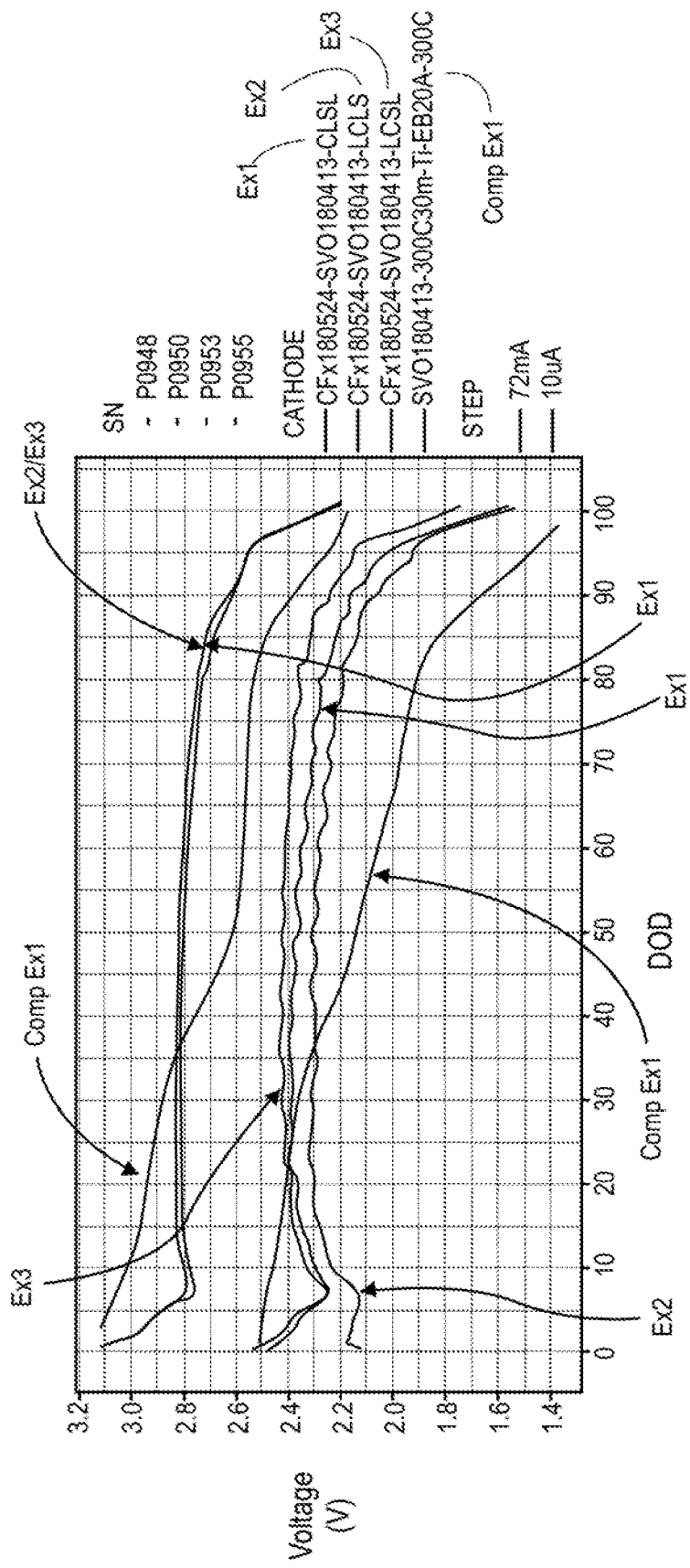
FIG. 6 is a graph of battery voltage as a function of depth of discharge in accordance with embodiments of the present disclosure.

FIG. 6 illustrates Voltage (V) as a function of depth of discharge (DOD) (in %) for the batteries of Examples 1 through 3, and Comparative Example 1. The solid lines in FIG. 6 are obtained using a 10 microampere (μA) background current. The dashed lines in FIG. 6 are obtained using a pulsed current of 30 milliamperes per square centimeter ($mA/cm^2$). As illustrated, examples 1-3 operated at a higher voltage during discharge than the comparative example using only SVO, and have a second plateau after ~90% DOD on discharge voltage curve, thereby providing an EOL indicator.

It is to be understood that the embodiments of batteries disclosed herein are merely illustrative of the principles and applications of the present disclosure.

Advantageously, the present disclosure may provide batteries having first and second cathodes using sub-fluorinated carbon fluoride (CFx) and SVO, respectively, as cathode active materials which together have high energy density, a high discharge rate capability, and which act as an EOL indicator for the battery.

To summarize, the present disclosure describes a battery comprising an electrode assembly, the electrode assembly comprising a first cathode including a first cathode active material, a second cathode including a second cathode active material different from the first cathode active material, a first anode disposed between the first cathode and the second cathode, a first separator interposed between the first cathode and the first anode, and a second separator interposed between the second cathode and the first anode; and/or the first cathode active material comprises carbon monofluoride; and/or the carbon monofluoride has a chemical formula CFx, wherein $0.8 \leq x \leq 1.2$; and/or the second cathode active material comprises silver vanadium oxide; and/or the silver vanadium oxide is $Ag_2V_4O_{11}$; and/or the first cathode comprises a current collector, a first electrode layer disposed on one side of the current collector, the first electrode layer including the first cathode active material, and a second electrode layer disposed on an opposite side of the current collector, the second electrode layer including the first cathode active material; and/or the first electrode layer includes the first electrode active material in an amount ranging from about 50 to 98 wt % based on the total weight of the first electrode layer; and/or each of the first electrode layer and the second electrode layer includes at least one material selected from the group consisting of a binder, a conductive material, and mixtures thereof; and/or the second cathode comprises a current collector, a first electrode layer disposed on one side of the current collector, the first electrode layer including the second cathode active material, and a second electrode layer disposed on an opposite side of the current collector, the second electrode layer including the second cathode active material; and/or the first electrode layer includes the second electrode active material in an amount ranging from about 50 to about 98 wt % based on the total weight of the first electrode layer; and/or each of the first electrode layer and the second electrode layer includes at least one material selected from the group consisting of a binder, a conductive material, and mixtures thereof; and/or the first cathode does not include the second cathode active material, and the second cathode does not include the first cathode active material; and/or the electrode assembly further comprises a second anode disposed on a side of the first cathode or a side of the second cathode opposite the first anode, and a third separator interposed between the second anode and a next adjacent cathode; and/or the electrode assembly further comprises a plurality of additional anodes, wherein one of the additional anodes is disposed on a side of the first cathode opposite the first anode, and another of the additional anodes is disposed on a side of the second cathode opposite the first anode, and a plurality of third separators, wherein one of the third separators is disposed between the one of the additional anodes and the first cathode, and another of the third separators is disposed between the another of the additional anodes and the second cathode; and/or the electrode assembly further comprises a plurality of additional anodes, wherein one of the additional anodes is disposed on a side of the first cathode opposite the first anode, and another of the additional anodes is disposed on a side of the second cathode opposite the first anode, a plurality of third separators, wherein one of the third separators is disposed between the one of the additional anodes and the first cathode, and another of the third separators is disposed between the another of the additional anodes and the second cathode, and a plurality of additional second cathodes, wherein the additional second cathodes are disposed on a side of the another of the additional anodes opposite the second cathode and between additional anodes, and the additional second cathodes are separated from the additional anodes by ones of the third separators; and/or disposed on a side of the another of the additional anodes opposite the second cathode and between additional anodes, and the additional second cathodes are separated from the additional anodes by ones of the third separators; and/or the anode includes an anode active material; and/or the anode active material is lithium (Li); and/or the battery further comprises a battery case, wherein the electrode assembly is disposed in the battery case; and/or the battery further comprises an electrolyte disposed in the battery case.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A battery, comprising:
an electrode assembly comprising:
  a first cathode including a first cathode active material, the first cathode active material comprising carbon monofluoride having a chemical formula $CF_x$, wherein $0.8 \leq x \leq 1.2$;
  a second cathode including a second cathode active material different from the first cathode active material, the second cathode active material comprising silver vanadium oxide having a chemical formula $Ag_2V_4O_{11}$;
  a first anode disposed between the first cathode and the second cathode;
  a first separator interposed between the first cathode and the first anode; and
  a second separator interposed between the second cathode and the first anode.

2. The battery of claim 1, wherein the first cathode comprises:
  a current collector;
  a first electrode layer disposed on one side of the current collector, the first electrode layer including the carbon monofluoride; and
  a second electrode layer disposed on an opposite side of the current collector, the second electrode layer including the first cathode active material.

3. The battery of claim 2, wherein the first electrode layer includes the carbon monofluoride in an amount ranging from about 50 to 98 wt % based on the total weight of the first electrode layer.

4. The battery of claim 2, wherein each of the first electrode layer and the second electrode layer includes at least one material selected from the group consisting of a binder, a conductive material, and mixtures thereof.

5. The battery of claim 2, wherein the first electrode layer includes about 94 wt % of the carbon monofluoride, about 4 wt % carbon black, and about 2 wt % PTFE, based on the total weight of the first electrode layer.

6. The battery of claim 1, wherein the second cathode comprises:
  a current collector;
  a first electrode layer disposed on one side of the current collector, the first electrode layer including the silver vanadium oxide; and
  a second electrode layer disposed on an opposite side of the current collector, the second electrode layer including the silver vanadium oxide.

7. The battery of claim 6, wherein the first electrode layer includes the silver vanadium oxide in an amount ranging from about 50 to about 98 wt % based on the total weight of the first electrode layer.

8. The battery of claim 6, wherein each of the first electrode layer and the second electrode layer includes at least one material selected from the group consisting of a binder, a conductive material, and mixtures thereof.

9. The battery of claim 6, wherein the first electrode layer includes 94 wt % $Ag_2V_4O_{11}$, 3 wt % carbon black, and 3 wt % PTFE, based on the total weight of the first electrode layer.

10. The battery of claim 1, wherein the first cathode does not include the silver vanadium oxide, and the second cathode does not include the carbon monofluoride.

11. The battery of claim 1, wherein the electrode assembly further comprises:
  a second anode disposed on a side of the first cathode or a side of the second cathode opposite the first anode; and
  a third separator interposed between the second anode and a next adjacent cathode.

12. The battery of claim 1, wherein the electrode assembly further comprises:
  a plurality of additional anodes, wherein one of the additional anodes is disposed on a side of the first cathode opposite the first anode, and another of the additional anodes is disposed on a side of the second cathode opposite the first anode; and
  a plurality of third separators, wherein one of the third separators is disposed between the one of the additional anodes and the first cathode, and another of the third separators is disposed between the another of the additional anodes and the second cathode.

13. The battery of claim 1, wherein the electrode assembly further comprises:
  a plurality of additional anodes, wherein one of the additional anodes is disposed on a side of the first cathode opposite the first anode, and another of the additional anodes is disposed on a side of the second cathode opposite the first anode;
  a plurality of third separators, wherein one of the third separators is disposed between the one of the additional anodes and the first cathode, and another of the third separators is disposed between the another of the additional anodes and the second cathode; and
  a plurality of additional second cathodes, wherein the additional second cathodes are disposed on a side of the another of the additional anodes opposite the second cathode and between additional anodes, and the additional second cathodes are separated from the additional anodes by one of the third separators.

14. The battery of claim 1, wherein:
the first cathode comprises:
  a first current collector;
  a first electrode layer disposed on one side of the first current collector, the first electrode layer including about 94 wt % of the carbon monofluoride, about 4 wt % carbon black, and about 2 wt % PTFE, based on the total weight of the first electrode layer; and
  a second electrode layer disposed on an opposite side of the first current collector, the second electrode layer including about 94 wt % of the carbon monofluoride, about 4 wt % carbon black, and about 2 wt % PTFE, based on the total weight of the second electrode layer;
the second cathode comprises:
  a second current collector;
  a third electrode layer disposed on one side of the second current collector, the third electrode layer including about 94 wt % $Ag_2V_4O_{11}$, about 3 wt % carbon black, and about 3 wt % PTFE, based on the total weight of the third electrode layer; and
  a fourth electrode layer disposed on an opposite side of the second current collector, the fourth electrode layer including about 94 wt % $Ag_2V_4O_{11}$, about 3 wt % carbon black, and about 3 wt % PTFE, based on the total weight of the fourth electrode layer.

\* \* \* \* \*